United States Patent [19]

Ratliff et al.

[11] 4,187,940
[45] Feb. 12, 1980

[54] FREE FLOATING, SELF-ALIGNING SHAFT COUPLING DEVICE

[75] Inventors: William K. Ratliff; Charles P. Warman, both of Wichita Falls, Tex.

[73] Assignee: Dana Corporation, Toledo, Ohio

[21] Appl. No.: 766,234

[22] Filed: Feb. 7, 1977

[51] Int. Cl.² ............................................. F16D 25/04
[52] U.S. Cl. .............................. 192/88 A; 192/110 S; 192/110 B; 192/DIG. 2; 64/13
[58] Field of Search ............. 192/110 B, 110 S, 88 A, 192/DIG. 2, 46.3

[56] References Cited

U.S. PATENT DOCUMENTS

| | | | |
|---|---|---|---|
| 3,276,556 | 10/1966 | Witt | 192/110 R |
| 3,351,167 | 11/1967 | Moss | 192/88 A |

FOREIGN PATENT DOCUMENTS 2339820  3/1975  Fed. Rep. of Germany ..... 192/85 AA

*Primary Examiner*—Benjamin W. Wyche
*Attorney, Agent, or Firm*—Frank B. McDonald

[57] ABSTRACT

A free floating coupling device for use between drive and driven shafts, which coupling device consists of a clutch portion on each shaft, which clutch portions are held in spaced apart relation by a tubular member which serves as a bearing lubricant chamber. The coupling allows power to be transmitted from the drive shaft to the driven shaft, even when a slight mis-alignment exists between the shafts. The anti-friction bearings allow full torque to be exerted between the shafts.

2 Claims, 8 Drawing Figures

FREE FLOATING, SELF-ALIGNING SHAFT COUPLING DEVICE

BACKGROUND OF THE INVENTION

This invention relates to a shaft coupling between a motor drive unit and a driven unit to maintain the motor drive shaft in operative relation with a mis-aligned driven shaft, which could be angular mis-alignment or axial mis-alignment, within limits, without causing undue stress to either the drive or driven parts associated with the shafts.

PRIOR ART

Various shaft couplings and alignment devices have been proposed heretofore, however, these, for the most part, presented certain deficiencies which the present device is designed to overcome, or improve upon. The various shaft coupling devices noted heretofore are shown by the following patents, Baker U.S. Pat. No. 2,403,326, Witt U.S. Pat. No. 3,276,556 and Barron U.S. Pat. No. 3,753,522.

SUMMARY OF THE INVENTION

The present device is utilized to align shafts where the axial movement or the angular movement of the mis-aligned shafts is critical, and which device normalizes the shafts to operate under either or both conditions, within limits, without damage to the elements associated therewith. By using a longitudinally expansible air tube clutch member intermediate the lengths of the drive and driven shafts, with the clutch portions being connected together in such manner that a floating member interconnects the two portions of the clutch to permit a limited variation of axial mis-alignment or angular mis-alignment without creating undue stress on either the drive or driven member parts, with the clutch portions exerting full torque through the shafts.

OBJECTS OF THE INVENTION

An object of this invention is to provide drive and driven shafts for power transmission, which shafts may be subject to misalignment either angularly or axially, or both, within limits.

Another object of this invention is to provide a shaft coupling for drive and driven shaft elements, which device holds the shafts in spaced apart relation by a tubular member, which tubular member retains lubricant therein to keep the bearings lubricated over a long period of time with a minimum of attention.

Another object of the invention is to provide a free floating tubular member between the clutch elements to enable both clutch portions to shift either angularly or laterally, within limits, with respect to the tubular member, without allowing the drive and driven shafts to move longitudinally.

Still a further object of the invention is to provide antifriction means between drive and driven shafts so that the torque may be fully transmitted between the drive and driven shafts, even through slightly misaligned.

Yet another object of the invention is to provide a free floating member between the clutch elements, one of which is restrained against lateral movement with respect to the longitudinal axis passing therethrough, while the other clutch element is permitted to be self adjusting with respect to the angularity of the drive and driven shaft members.

A further object of the invention is to provide a free floating member between the clutch elements, with provision being made to restrain one of the clutch elements against movement with respect to the longitudinal axis thereof to enable one set of bearings to perform the alignment function between the drive and driven clutch elements, with adapters being detachably connected, so they can be interchanged so the other bearings will perform the adjustment of one clutch member with respect to the other clutch member, and the second clutch member will then be held in longitudinal alignment with the coupling member.

Still another object of the invention is to provide a lubricating chamber for bearings which is cylindrical in form and which has lubricant seals so installed as to permit the escape of lubricant to the outside of the lubricant chamber, in event of expansion, to a position removed from the friction elements of the clutch.

Yet a further object of the invention is to provide a combination of resilient discs and bearings, to enable the drive and driven shafts of a power transmitting device to run in mis-aligned relation, either axially or angularly or both, with bearings to support a coupling device to float within an arcuate bearing seat to permit the shafts to be driven in this manner without material damage to the drive and driven elements.

Yet another object of the invention is to provide a free floating coupling between drive and driven shafts, which coupling connects a motor or other power transmitting element with a gear reduction element, which may have herringbone gears, helical gears, or worm gears, or the like, which will maintain the coupling element in such position as to restrain movement of either the drive or driven shaft longitudinally to prevent damage either to the motor or to the gear arrangement.

BRIEF DESCRIPTION OF THE DRAWINGS

With these objects in mind and others which will become manifest as the description proceeds, reference is to be has to the accompanying drawings, in which.

DETAILED DESCRIPTION OF THE PREFERRED FORM OF THE INVENTION

Figure 1:
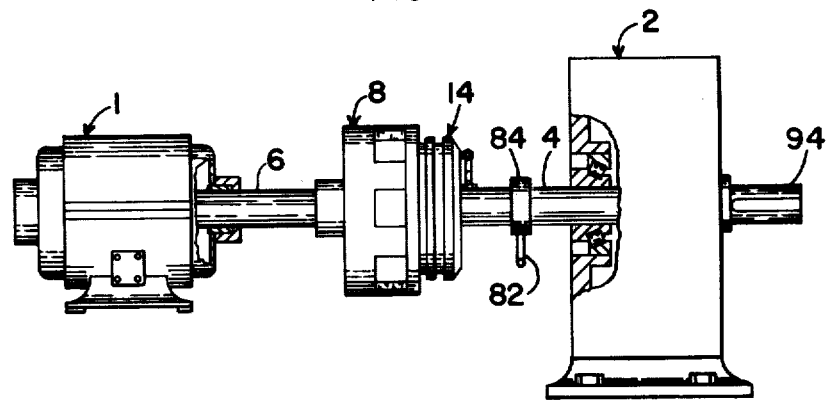
FIG. 1 is an elevational view showing a power output means, such as a motor, an axially expansible clutch coupled between a drive shaft and a driven shaft, showing an air input roto-coupling intermediate the length of the driven shaft to direct air into the axially expansible, fluid actuated clutch, and showing the driven shaft connected in driving relation with a driven element, which could be a gearing arrangement, with parts being broken away and with parts being shown in section.

With more detailed reference to the drawing in which like reference characters designate like parts in the several views thereof, and referring now particularly to FIGS. 1 through 4, the numeral 1 designates generally a prime mover, such as a motor, with the numeral 2 designating generally any driven element, such as a speed reducer, which could be herringbone gears, helical gears or worm gear units, is not limited thereto. The driven shaft 4 is required to be in aligned driving relation with the drive shaft 6 of the motor, or any mis-alignment compensated for by a shaft coupling unit, which is designated generally at 8, which unit 8 has an annular ring 22 therearound which forms a housing.

The shaft alignment coupling unit 8 comprises a flanged drive shaft connection portion 10, which portion 10 is keyed in fixed relation to the drive shaft 6 by a key 12, and rotates therewith. A clutch, designated generally by the numeral 14, has a fluid actuated, axially expansible tube 15 between the pressure plate 13 and back-up plate 16 thereof. The driven part 16 of the clutch 14 is connected, by bolts to the back-up plate 80, the hub of which back-up plate is connected to the driven shaft 4 and is fixed thereto by a key 20. An annular ring 22 is detachably connected, by bolts 24, around the other flange portion 11 of the shaft alignment coupling unit 10 and rotates therewith.

An annular, internally toothed, ring 26 having teeth 28 therein, is detachably connected with annular ring 22 by bolts or cap screws 30. The teeth interengage with the teeth 32 of the friction member 34 of the clutch 14, so that the friction member rotates with the drive shaft 6, when the driven shaft 4 rotates. The teeth 28 of the ring 26 and the teeth 32 of the friction member 34 have a normal degree of working tolerance to accomodate a limited amount of mis-alignment, both radial and axial, therebetween so as to permit the tubular member 36 to move transversely about an axis to permit full torque to be transmitted from the drive shaft 6 to the driven shaft 4, permitting only a minimal amount of longitudinal movement between the shafts and yet permitting axial and angular mis-alignment, within tolerable limits, thereby enabling full torque to be transmitted to the driven shaft, when the clutch 14 is engaged.

The tubular member, designated generally at 36, is flanged on each end, as indicated at 38, each which flange is apertured to receive bolts 40 therethrough to secure annular flanges 42 thereto, which flanges 42 retain the bearings 46 against outward movement. The tubular member 36 has a lubricant fitting 43 screw threaded thereinto to direct lubricant into a reservoir 44 which is formed in tubular member 36. A relief valve 45 is provided in tubular member 36 and is connected to the reservoir 44 to convey excess lubricant therefrom. The reservoir 44 may be filled with lubricant for lubrication of the bearings 46, which bearings are mounted in journaled relation on inwardly extending hubs 48. Each inwardly extending hub is made integral with one of the flanges 49. Each of the flanges 49 has circumferentially spaced holes 51 formed therein near the periphery thereof. The bearings 46 are held against inward longitudinal movement by clip rings 50, which clip rings 50 are seated in annular grooves 52 formed in the inwardly extending hubs 48. The respective hubs 48 are shouldered, as indicated at 54. The outer diameter 56 of the bearings 46 is fitted within the inner diameter of tubular member 36, with the outer diameter of clip rings 53 being fitted within annular grooves 58 in tubular member 36 to hold the bearings 46 against shoulders 60 to prevent longitudinal movement relative to the respective flanges 42. Bolts 40 pass through flanges 42 and through outturned flanges 38 to hold shouldered portions 60, on annular flanges 42 against longitudinal movement with respect to tubular member 36. Each flange 42 has a central bore formed therein to receive a lubricant sealing ring 62.

The annular ring 64 has circumferentially spaced holes 66 formed therein in position to register with the holes 51 in one of the flanges 49, so that screw threaded bolts 68 may pass through the respective pairs of registering holes and threadably engage with flanged drive shaft coupling portion 10. The annular ring 64 has outturned flange 70 therearound, which flange 70 registers with and engages annular groove 72 formed in flanged drive shaft coupling portion 10. The ring 64 is held in place by bolts 68. A similar ring 74 is fitted at the opposite end of tubular member 36 and has out-turned flange portion 76 thereon, which out-turned portion 76 of the ring 74 fits in an annular groove 78, and is bolted in place by bolts 79 to hold the annular ring 74 in binding engagement with the other of the flanges 49 to hold the flange in secure relation to clutch back-up plate 80.

With the annular rings 64 and 74 bolted in place by means of bolts 68 and 79, the tubular means 36 holds the shaft alignment coupling unit 8 against relative longitudinal movement with respect to clutch back-up plate 80. However, the axially expansible, fluid actuated tube clutch 14 will permit axial mis-alignment of the shafts 6 and 4, to a limited degree, but still allow full torque to be exerted through the shaft alignment coupling unit 8. The spherical roller bearings 46 will also permit angular movement of the drive shaft 6 relative to the driven shaft 4, without damage to the motor or to the gears.

The axially expansible, fluid actuated clutch tube 15 is positioned between clutch pressure plate 13 and clutch back-up plate 16 to move the clutch plate 33 against the friction member 34, having teeth 32 thereon, normally axially of the shaft alignment coupling unit 8, but with the tubular connection 36 allowing mis-alignment of the shafts, both angularly and axially, without throwing undue strain on the machinery and without permitting the driven shaft 4 to move relative to the gears to cause damage in the speed reducer 2 or the like.

Various arrangements may be made to direct a source of fluid under pressure to the axially expansible, fluid actuated tube 15, however, in the present instance, a conduit 82 directs fluid from a source of fluid under pressure (not shown) into a fluid seal coupling 84 intermediate the length of the driven shaft 4. The driven shaft 4 is drilled axially, as indicated at 86, and plugged at the outer end, as indicated at 87. The driven shaft 4 is also cross drilled, as indicated at 88 and 89, so as to direct fluid under pressure into conduit 90, which conduit is connected through couplings 92 to fluid actuated, axially expansible tube 15. The fluid seal coupling 84 is well known in the art of couplings, however, when it is desired, a rotary fluid seal coupling may be mounted on the end of the driven shaft 4, although this forms no part of the invention, and is simply a choice of mechanical expedients.

The speed reducer 2, as shown in FIG. 1, has a final output shaft, as indicated at 94.

SECOND FORM OF THE INVENTION

Figure 5:
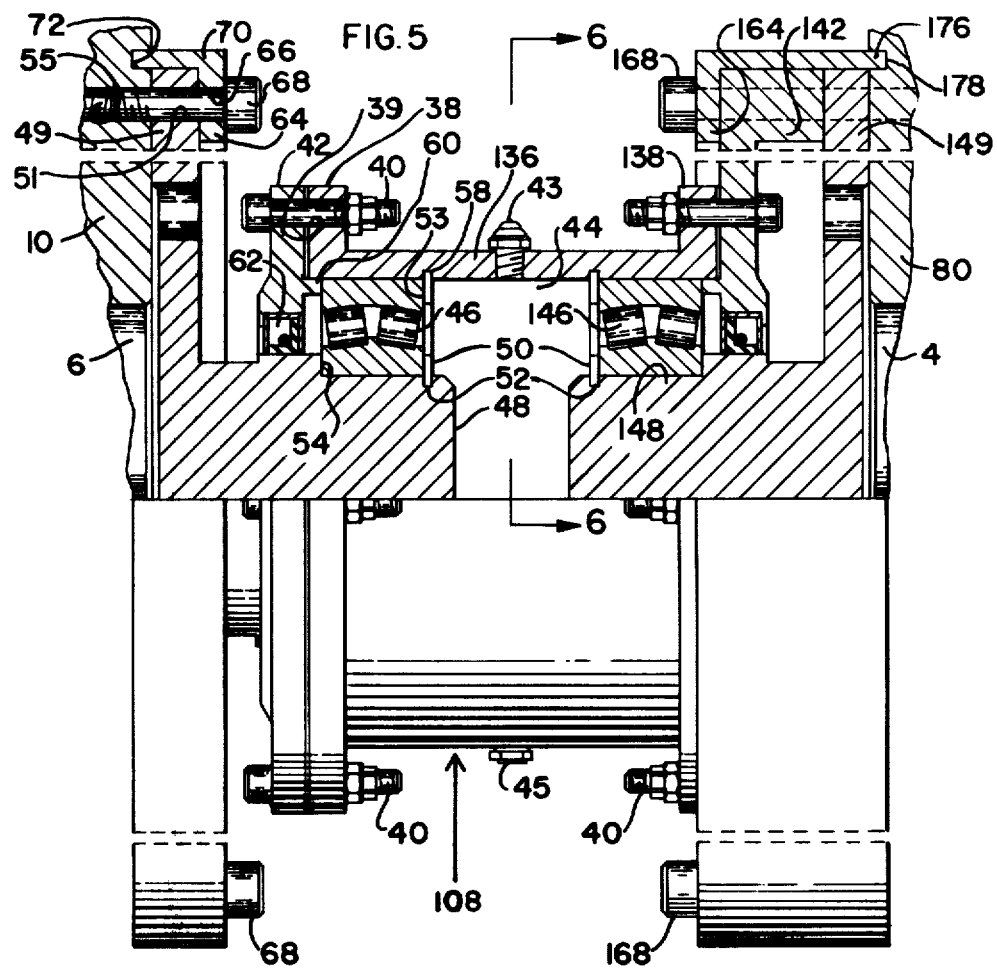
FIG. 5 is a view similar to FIG. 3, but of a second form of the invention.
Figure 6:
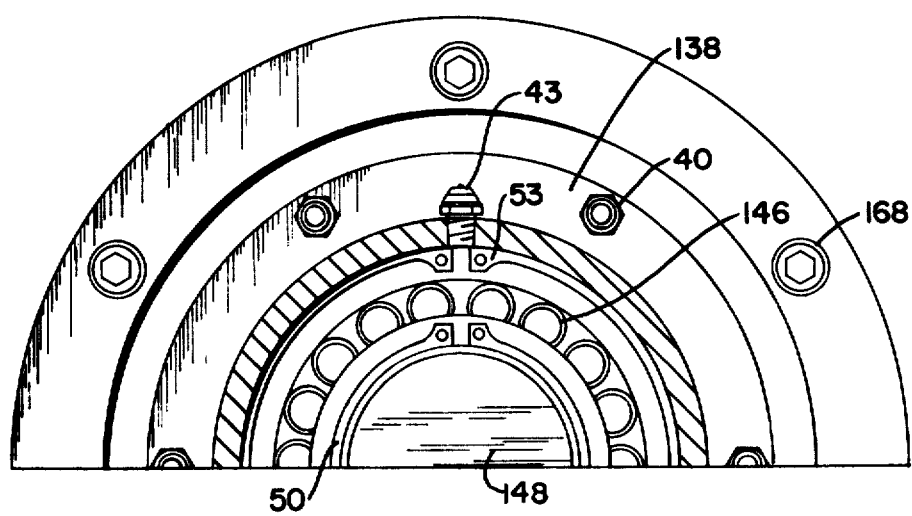
FIG. 6 is a sectional view taken on the line 6—6 of FIG. 5, looking in the direction indicated by the arrows.

The form of the invention as shown in FIGS. 5 and 6, when taken with the driving arrangement and gear reduction unit, as shown in FIG. 1, discloses drive shaft 6 of a prime mover, such as shown in FIG. 1, driving through a coupling arrangement member, designated generally at 108, which coupling arrangement member is similar in construction to the shaft alignment coupling 8, as shown and described for the aforementioned form of the invention.

In order to avoid repetition, a portion only of the flanged drive shaft coupling portion 10, as well as a portion of the drive shaft 6, a portion of the back-up plate 80 and a portion of the driven shaft 4, together with a tubular mounting member, as designated generally at 136, are shown. The member 136 holds the flanged drive shaft coupling portion 10 and the back-up plate 80 connected together to maintain the drive shaft coupling portion 10 and the clutch back-up plate 80 against relative longitudinal movement, but in relative rotational relation, when the clutch 14 is disengaged. The flanged drive shaft coupling portion 10 has bolts 68 securing an annular ring 64 thereto, which annular ring 64 has an out-turned flange 70 thereon. The out-turned flange 70 fits within annular groove 72 to secure the flange 49 in aligned binding engagement with the flanged drive shaft coupling portion 10, so that the flange 49 and the hub 48 will rotate in unison. The hub 48 has an annular groove 52 formed therein to receive a slip ring 50 to hold the bearing 46 against shoulder 54. A clip ring 53 is fitted within an internal annular groove 58 within tubular member 136 to hold the bearing 46 against shoulder 60 on apertured flanges 42. The out-turned flange 38 is apertured to receive bolts 40 therethrough and through the aperture in flange 42 so as to hold the bearing 46 against outward longitudinal movement.

The flange 42 has an axial bore therein which bore is fitted with a lubricant seal 62, so as to retain lubricant in chamber 44 formed in tubular member 136. The bearing 46 may move about within the spherical seat thereof, to a limited degree, to compensate for any angular misalignment of the drive and driven shafts. The bearing 146 is provided on inwardly extending hub 148, however, under normal operating conditions, the bearing 146 serves as an alignment member and does not function as a bearing, however, should the bearing 46 fail to perform, the bearing 146 may be removed and interchanged with the bearing 46 in a minimum of time.

An apertured annular ring 164 has an out-turned ring 176 thereon, which ring 176 registers with an annular groove 178, and is secured in place by bolts 168 passing through annular ring 164, through ring 142 and through ring 149 to secure ring 142 to back-up plate 80 so as to make annular ring 164 non-rotatable with respect to back-up plate 80. However, upon disengagement of the clutch 14, the annular ring 164 and the tubular member 136 will rotate in unison on the bearing 46 which is mounted in journaled relation on inwardly extending hub 48. In this manner the second form of the invention will also give a limited angular movement between the drive shaft 6 and the driven shaft 4 within the tubular mounting member 136, when the clutch is engaged, to transmit the full torque through the tubular mounting member 136.

A flange 149, similar to the flange 49, is secured, by bolts 168, to the annular ring 164 and to clutch back-up plate 80 in fixed relation.

It is to be seen that this form of the invention will permit the spherical bearing 46 to compensate for angular mis-alignment between the drive and driven shafts, without permitting relative longitudinal movement thereof, when the clutch 14 is in operation.

THIRD FORM OF THE INVENTION

Figure 2:
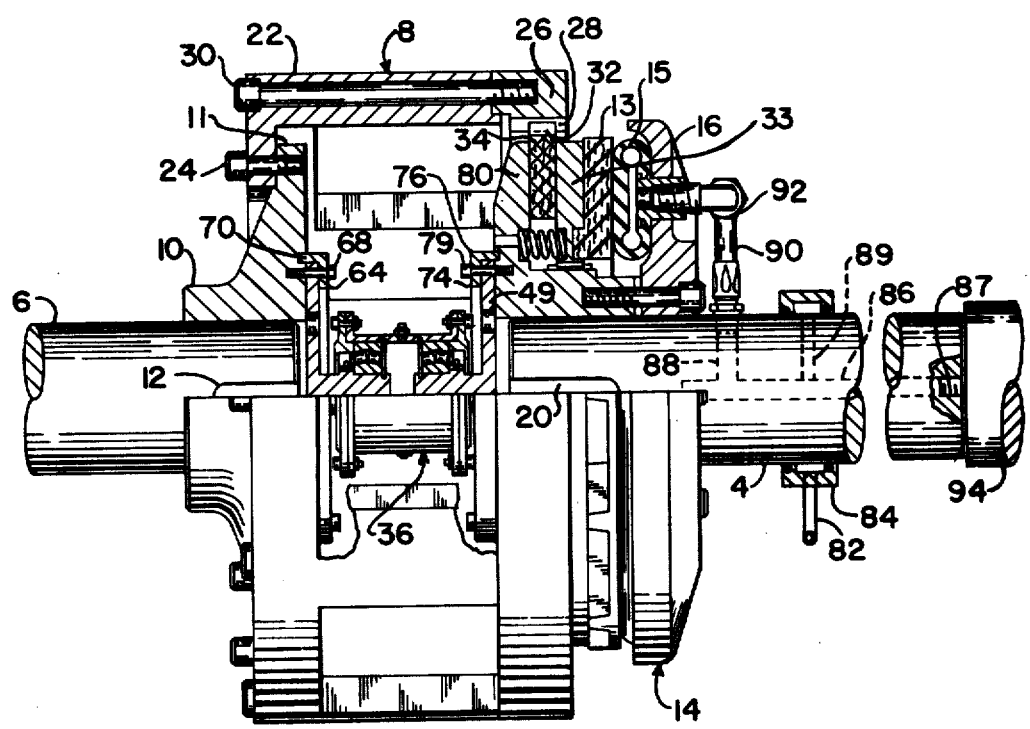
FIG. 2 is a view of a clutch coupling unit between drive and driven shafts, partly in elevation, and showing a quarter section removed longitudinally from the coupling unit to show the interior construction, the air passage within the driven shaft being shown in dotted lines.
Figure 3:
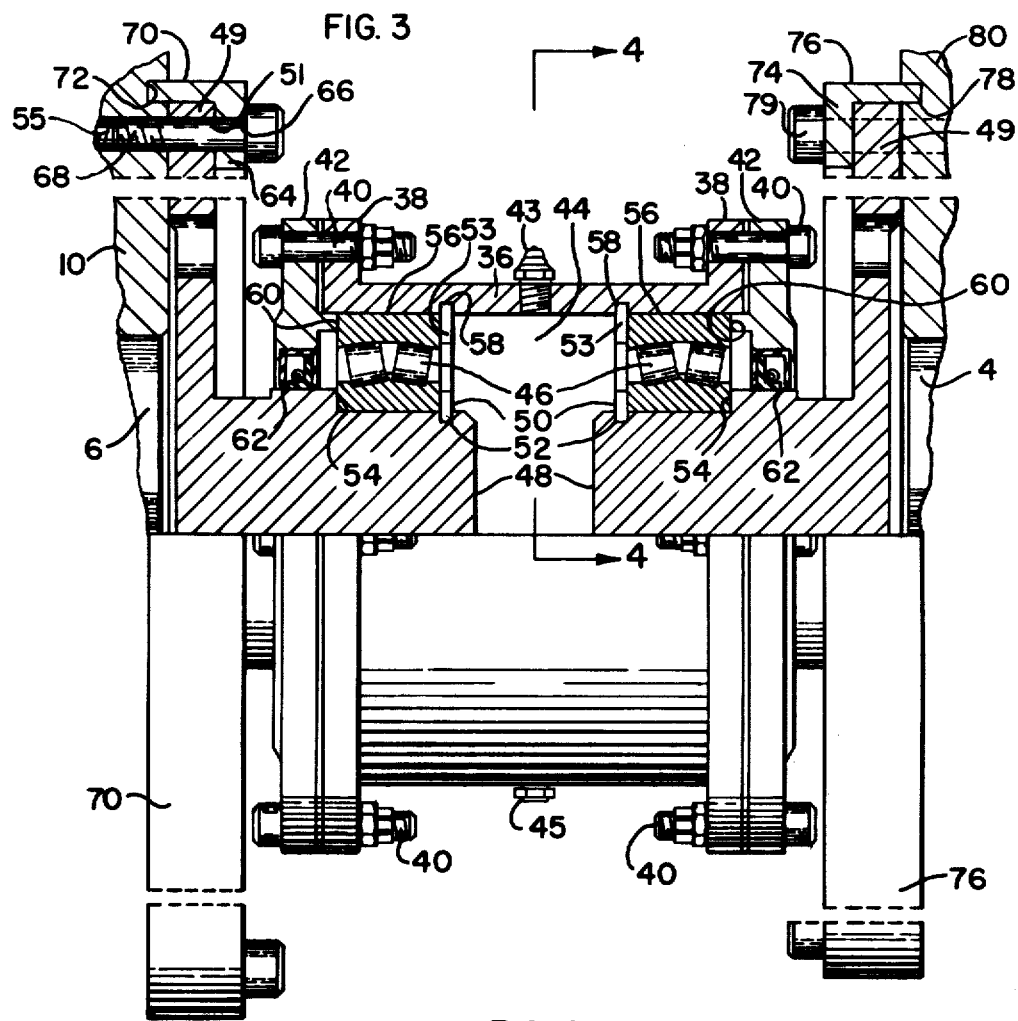
FIG. 3 is an enlarged view, partly in section and partly in elevation, of the free floating shaft aligning device mounted between the drive and driven shafts, showing portions of the drive and driven shafts and the clutch portions associated therewith, a longitudinal quarter section being removed to show the details of construction of both the interior and exterior of the free floating, self-aligning coupling.
Figure 4:
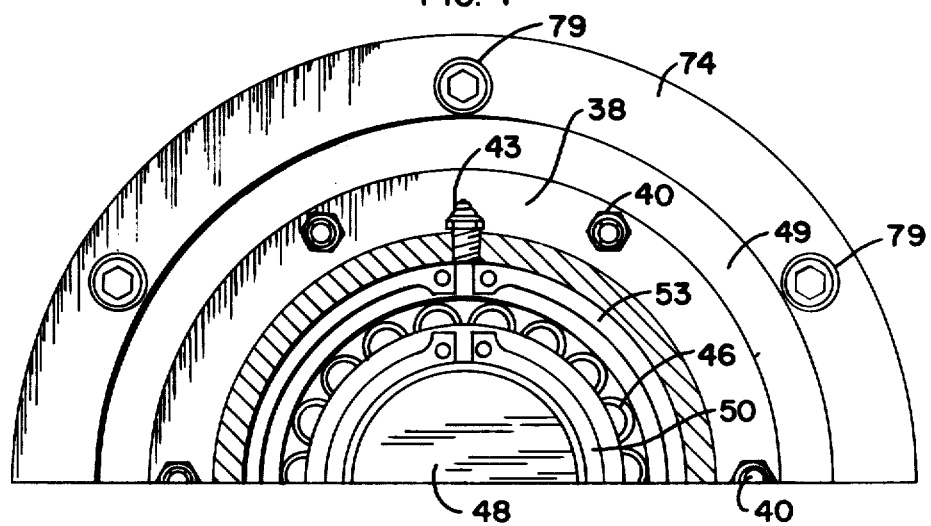
FIG. 4 is a sectional view taken on the line 4—4 of FIG. 3, looking in the direction indicated by the arrows.
Figure 7:
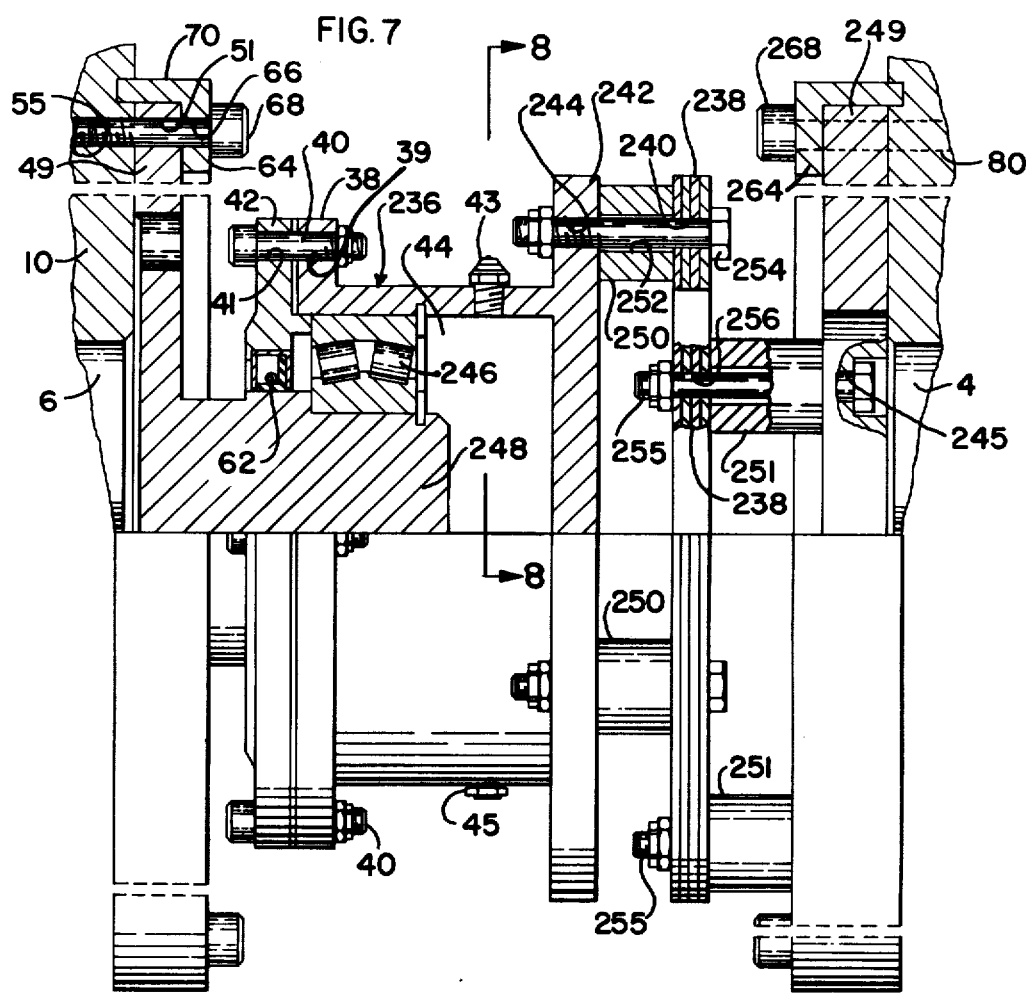
FIG. 7 is a view of a third form of the invention, which view is similar to the view shown in FIG. 3.
Figure 8:
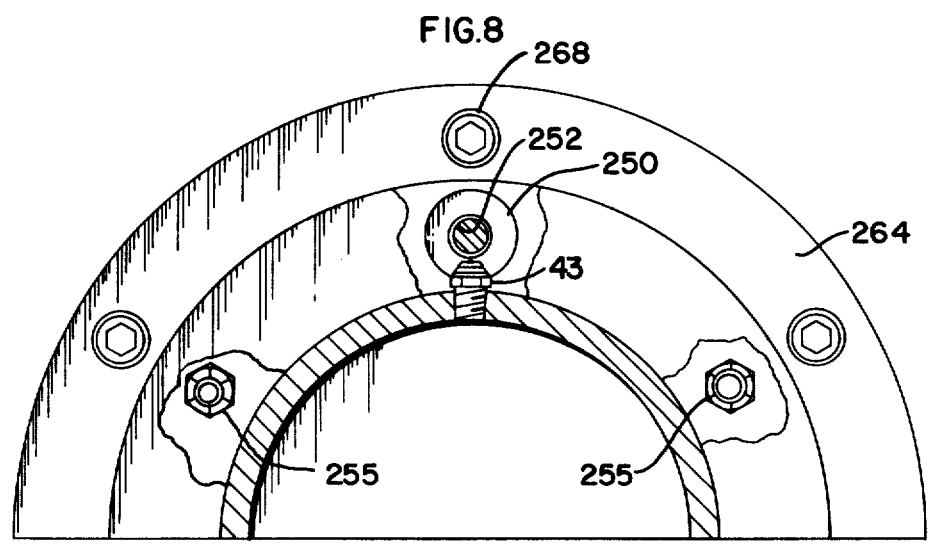
FIG. 8 is a sectional view taken on the line 8—8 of FIG. 7, looking in the direction indicated by the arrows, with parts being broken away to show the details of construction.

The third form of the invention utilizes a tubular housing member 236 within the shaft alignment coupling, such as shown at 8 in FIGS. 1 and 2. Referring now to FIGS. 7 and 8, one longitudinal portion of the tubular member 236 has a spherical bearing 246 journaled intermediate the tubular member 236 and an inwardly extending hub portion 248, so as to allow limited alignment movement between the tubular member 236 and the inwardly extending hub portion 248, which hub portion has an out-turned flange portion 49 formed integrally therewith, which flange portion 49 has circumferentially spaced holes 51 formed therein, which holes are adapted to register with circumferentially spaced holes 66 which are formed in annular ring 64 and also with circumferentially spaced, screw threaded holes 55 formed in the flanged drive shaft coupling 10, with bolts 68 passing through the respective holes and threadably engaging with the flanged drive shaft coupling 10, so the hub 248 and flanged drive shaft coupling 10 will rotate in unison with drive shaft 6.

The tubular member 236 has an up-turned flange 38 thereon, which flange 38 has circumferentially spaced holes 39 formed therein. A flange 42 has circumferentially spaced holes 41 formed therein, which holes 41 are adapted to register with holes 39 in up-turned flange 38. The holes 39 and 41, in the respective flanges 38 and 42 are adapted to register to receive bolts 40 therethrough to hold the flange 42 in place, so the lubricant seal 62 will seal against the hub 248 so as to maintain a lubricant chamber 44 in the tubular member 236. A lubricant fitting 43 enables the introduction of lubricant into chamber 44. A relief valve 45 enables the lubricant to be vented to atmosphere when the pressure in chamber 44 exceeds the set pressure of relief valve 45.

The other longitudinal portion of the tubular housing member 236 has an up-turned flange 242 thereon, which flange forms an inner closed end for the lubricant chamber 44. The flange 242 preferably has equally spaced circumferential holes 244 formed therein, three of which holes are preferably spaced 120 degrees apart. A plurality of resilient, annular members 238 each have sets of holes 240 formed therein, which holes are complementary to and register with certain holes 244 in flange 242. Hollow spacer members 250 are positioned between out-turned flange 242 and resilient annular member 238, each which spacer member has a bore 252 therein, which bores are slightly larger in diameter than bolts 254 which pass through the holes 240 in the resilient, annular members 238 and through the bores 252 in the spacer members 259 and through the holes 244 in the out-turned flange 242, so as to fixedly secure the resilient, annular member 238 to the up-turned flange 242.

Spaced equidistant between the holes 240 in resilient, annular members 238 is another set of holes 256, of like character, to receive bolts 255 therethrough and through hollow spacers 251, with the bolts 255 passing through the holes 245 in the flange 249, which holes are preferably spaced 120 degrees apart and are in register with certain of the holes 256 in resilient, annular members 238.

The holes 240 and 256 are preferably spaced 60 degrees apart which makes the holes 26 spaced equi-distant between holes 240, with the bolts 255 securing hollow spacer members 251 between resilient, annular members 238 and the flange 249, which flange 249 is secured in place by bolts 268.

The bolts 268 secure annular ring 264 and flange 249 to the back-up plate 80, so that the resilient, annular members 238 and tubular member 236 will rotate with the back-up plate 80 when the clutch is engaged.

The flexing of the resilient, annular members 238 permits angular and axial mis-alignment within a limited degree, upon rotation of drive shaft 6 and driven shaft 4 to permit proper angular and axial alignment, within a limited degree, when the clutch is engaged, to allow full torque to be transmitted therethrough, even though there may be a slight mis-alignment between the shafts, either angularly, axially, or both.

The bearing 246 may be inserted into place in the same manner as is set out for the first described form of the invention. The bearing 246 is held in place by clip rings in the same manner as described for the first form of the invention. This form of the invention is enclosed within the shaft alignment coupling housing or ring, as shown by the numeral 22 in FIG. 1.

What is claimed is:

1. A device which compensates for mis-alignment between drive and driven shafts, which device comprises;
   (a) a rotary drive shaft,
   (b) a rotary drive shaft alignment coupling fixedly secured to said rotary drive shaft,
   (c) a rotary driven shaft,
   (d) a portion of a fluid actuated, axially expansible clutch member secured to said driven shaft and being rotatable therewith,
   (e) a clutch friction disc member interposed between said rotary alignment coupling unit and said axially expansible, fluid actuated clutch portion,
   (f) said clutch portion of said fluid actuated, axially expansible clutch member being adapted to selectively engage said clutch disc member,
   (g) a tubular member within said rotary shaft alignment coupling unit,
      (1) a pair of inwardly extending hubs each secured respectively to said rotary shaft alignment coupling unit and to said clutch portion, each said hub being substantially in alignment with the respective drive and driven shafts, when in one position,
   (h) said tubular member having at least one bearing seat formed therein,
      (1) at least one self-aligning bearing within said bearing seat in said tubular member intermediate one of said hubs and said tubular member,
   (i) said friction disc clutch member and said tubular member interconnecting said driven shaft and said drive shaft so as to compensate for limited mis-alignment between said driven shaft and said drive shaft, without permitting longitudinal movement of one shaft relative to the other of said shafts, while permitting full torque to be transmitted from said drive shaft to said driven shaft.

2. A device for maintaining drive and driven shafts in relatively rotatable relation and against longitudinal movement with respect to each other, which device comprises;
   (a) a rotatable drive shaft,
   (b) a rotatable driven shaft,
   (c) a rotary, axially aligned coupling fixedly secured to said rotary drive shaft,
   (d) a portion of a fluid actuated, axially expansible clutch member secured to said driven shaft, and being rotatable therewith,
   (e) a clutch friction disc member interposed between the coupling unit and said axially expansible fluid actuated clutch portion,
      (1) said portion of said fluid actuated, axially expansible clutch member being adapted to engage with said clutch disc member,
   (f) a tubular member within said rotary shaft alignment coupling unit,
   (g) an inwardly extending hub secured to said rotatable shaft coupling unit and an inwardly extending hub secured to said clutch portion,
      (1) the axis of each said hub being substantially in alignment with the respective drive and driven shafts, when in one position,
      (2) said tubular member having at least one bearing seat formed therein,
      (3) at least one self-aligning bearing within said bearing seat in said tubular member intermediate one said hub and said tubular member,
   (h) said friction disc clutch member and said tubular member interconnecting said driven shaft and said drive shaft so as to allow relative rotational movement therebetween without allowing longitudinal movement of one said shaft relative to the other of said shafts, while allowing full torque to be transmitted from said drive shaft to said driven shaft.

* * * * *